United States Patent

Cornec et al.

[11] Patent Number: 5,866,884
[45] Date of Patent: Feb. 2, 1999

[54] HIGH EFFICIENCY INDUCTION COOKING-RANGE

[75] Inventors: RenéCornec, Saran; Jean-Yves Gaspard, Chateauneuf Sur Loire; Noel Burais, Villeurbanne, all of France

[73] Assignee: Compagnie Europeenne Pour l'Equipement Menager - Cepem, Saint Jean De La Ruelle, France

[21] Appl. No.: 853,178

[22] Filed: May 7, 1997

[30] Foreign Application Priority Data

May 14, 1996 [FR] France ................................. 96 05978

[51] Int. Cl.⁶ ................................................ H05B 6/12
[52] U.S. Cl. ........................ 219/622; 219/624; 219/649; 219/675
[58] Field of Search ................................. 219/622, 623, 219/624, 647, 649, 675

[56] References Cited

U.S. PATENT DOCUMENTS

| | | | |
|---|---|---|---|
| 3,790,735 | 2/1974 | Peters Jr. | 219/622 |
| 3,843,857 | 10/1974 | Cunningham | 219/622 |
| 5,369,249 | 11/1994 | Kwon | 219/624 |
| 5,376,774 | 12/1994 | McGaffigan et al. | 219/624 |
| 5,428,207 | 6/1995 | Essig et al. | 219/622 |
| 5,686,006 | 11/1997 | Gaspard | 219/622 |

FOREIGN PATENT DOCUMENTS

| | | |
|---|---|---|
| 0 277 075 | 8/1988 | European Pat. Off. . |
| 498 735 | 8/1992 | European Pat. Off. . |
| 0 706 303 | 4/1996 | European Pat. Off. . |
| 2 668 019 | 4/1992 | France . |
| 2 672 763 | 5/1993 | France . |
| 2 728 132 | 2/1997 | France . |

*Primary Examiner*—Philip H. Leung
*Attorney, Agent, or Firm*—Oblon, Spivak, McClelland, Maier & Neustadt, P. C.

[57] ABSTRACT

The disclosed induction cooking range comprises, in the commonly known way, an upper plate made of glazed ceramic designed to receive a receptacle to be heated made of ferrite material, a monoconductor induction coil positioned beneath the upper plate on a coil support and excited by a high-frequency current generator. The induction coil is allowed to heat by its own losses to a temperature greater than that of the receptacle and the induction coil communicates its own heat to the receptacle. The overall efficiency of the range is thus appreciably increased. The induction coil, which must then tolerate a high temperature, is made out of a flat, monoconductor strip placed between two sheets of mica.

15 Claims, 1 Drawing Sheet

HIGH EFFICIENCY INDUCTION COOKING-RANGE

BACKGROUND OF THE INVENTION

1. Field of the Invention

The present invention relates to induction cookers. in induction cooking, the substance to be cooked is placed in a magnetic receptacle heated by a flow of currents in its walls caused by a high-frequency electromagnetic field ranging from some kHz to some hundreds of kHz. The high-frequency electromagnetic field is generated by a flat induction coil that is placed on a support placed beneath a glazed ceramic plate on which the receptacle to be heated is placed, this plate being excited by a high-frequency AC electrical current given by an inverted rectifier.

2. Description of the Prior Art

The induction coil is usually formed by a pancake coil made out of a flat and spiral winding of a multiple-strand conductor of copper wires that are insulated from one another by an electrically insulating varnish to optimize the passage of high-frequency current (limitation of the skin effect) and minimize heating losses.

The insulating varnish of such a coil generally does not withstand temperatures of more than 220° C., any more than the material of its support, which is often a molded plastic, withstands such temperatures. This makes it necessary to provide for a cooling of the induction coil through its support by means of the forced-air ventilation of the lower side of the range and also to provide for the thermal insulation of the induction coil with respect to the receptacle forming its load.

Forced-air ventilation increases the cost of an induction cooking range while thermal insulation with respect to the load requires that the induction coil should be moved away from the glazed ceramic plate supporting the receptacle. This increases the gap, reduces the coupling between the induction coil and the receptacle and increases the level of radiated disturbance.

In addition to the cooling, it is sometimes necessary in certain types of cooking, to shield the induction coil against excess heating by reducing the current delivered by the inverted rectifier.

It has also been proposed to make monoconductor induction coils either out of a rigid copper wire with a circular section having a diameter of 1 mm to 1.3 mm positioned in a helical groove hollowed out on the surface of an electrically insulating flat support or out of a copper tape that is wound edgeways and is therefore vertical, in a helix, between two mica plates. This arrangement permits a variation of the pitch of the coil from the center to the periphery in order to homogenize the distribution of temperature at the bottom of the receptacle.

These induction coils, with their supports, have a relatively great thickness. This is a handicap for the compactness of the instruments, especially for the market of domestic cookers.

SUMMARY OF THE INVENTION

The present invention is aimed at overcoming these drawbacks by abandoning the idea of limiting the losses of the induction coil, allowing it on the contrary to get heated and cooling it by its load. For this purpose, the induction coiling should attain high temperatures in the range of a maximum of 400° C. It is then out of the question to try to achieve and electrical insulation of the strands of the conductor with respect to one another for the insulating varnish withstanding these temperatures is extremely costly. This is why a monoconductor induction coil is used.

An object of the invention is an induction cooking range comprising an upper plate made of a ceramic material designed to receive a receptacle to be heated made of ferrite material, a monoconductor induction coil positioned beneath the upper plate on a coil support and excited by a high-frequency current generator, wherein the monoconductor induction coil consists of a flat conductive strip wound flat in a spiral and separated from the upper plate by a thermally conductive sheet consisting of a heat-resistant electrical insulator.

The flat conductive strip of the induction coil may be made of copper with a cross-section corresponding to a current density of the order of 30 A/mm$^2$. It may also be made of aluminum.

The induction coil may be made by the flat, spiral winding of a flat conductive strip. It may also be made by cutting out a flat, spiral conductor from a sheet of non-magnetic, electrically conductive material such as copper or aluminum by means of a chemical or mechanical process, coating this cut-out conductive strip with a heat-resistant, electrically insulating compound in order to plug the spaces between the turns in pressing the cut-out conductive strip thus coated between two sheets of electrical insulator to form a sandwich and subjecting the laminated structure obtained to heat treatment to form a compact assembly that can be easily handled.

The coil can be simply placed on the thermally insulating lower support without any fixed link. This enables the use, for the support and electrical insulation of the upper plate, of materials with heat expansion coefficients that are different from that of the spiral, the spiral being free to change under temperature.

The coil may also be insulated from its support by a second electrically insulating sheet that is thicker than the one interposed beneath the upper sheet in order to counter the heat conduction from the coil to the support.

According to another characteristic of the invention, the induction coil consists of a series, parallel, or series-parallel combination of several flat coils with limited unit lengths, distributed on the surface of the cooking range.

The sheets of high-temperature electrical insulator are advantageously mica sheets, which are thin in the case of sheets interposed beneath the upper plate and thick in the case of the sheet interposed on the support.

The thermally insulating coil support is advantageously made of fiberglass.

With this type of flat conductor coil, wound flat in a spiral, it is possible to obtain a pancake coil whose thickness does not exceed 0.5 mm. This is sufficient for the passage of the high-frequency currents which, in any case, do not, at the normal working frequency of 25 kHz, penetrate more than 0.5 mm into the thickness of the conductor owing to the skin effect and the proximity of the receptacle. Since the width of the pancake of the coil is conditioned by the size of the receptacle to be heated and the number of turns of the coil by the impedance to be brought back in terms of load to the high-frequency generator, a thickness of 0.5 mm leads to a cross-section of about 1 mm$^2$. This explains the high level of losses of the coil at maximum power and hence its working temperature. However, the shape of the coil favors contact with the load and hence cooling. It must be noted that the thickness of the turn may be quite different as a function of the power of the generator, the frequency of use and the conductor material used. Similarly, the width is adapted to the power and above all to the type of generator used.

BRIEF DESCRIPTION OF THE DRAWINGS

Other features and advantages of the invention shall appear from the following description of an embodiment given by way of an example. This description shall be made with reference to the appended drawing, of which.

MORE DETAILED DESCRIPTION

Figure 1:
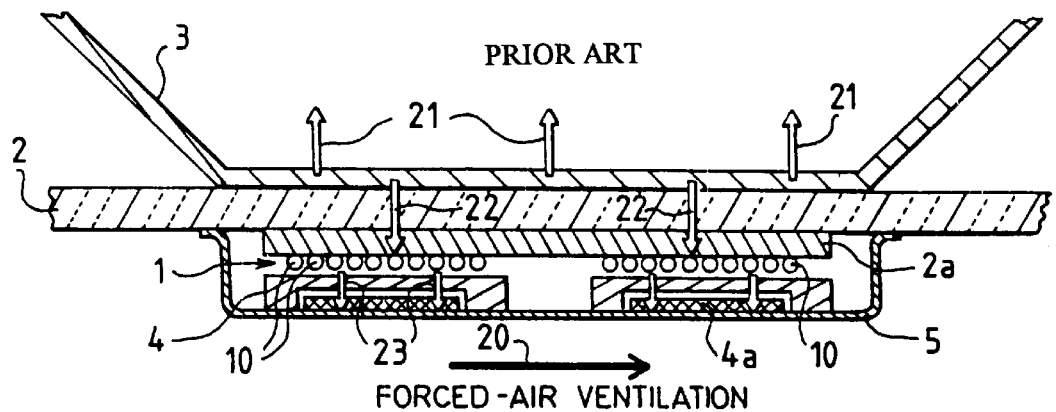
FIG. 1 shows a cross-sectional view of the habitual structure of an induction cooking range, FIG. 2 gives a cross-sectional view of the structure of an induction cooking range according to the invention.

The induction cooking range shown in FIG. 1 is of standard design. It has a flat induction coil 1 placed beneath the plate 2, made of glazed ceramic for example, designed to receive a receptacle 3 to be heated, the walls of which are made of a ferrite material.

The flat induction coil 1 consists of a flat spiral winding of a multiplestrand conductor of copper wires individually coated with a layer of electrically insulated varnish, the different turns of which are referenced 10. It is positioned on or bonded to a coil support 4 and separated from the plate 2 by a layer of thermal insulator 2a which can consist of a sheet of air, ceramic paper or glass wool. This layer of thermal insulator 2a protects the flat induction coil I from heating by the receptacle 3.

The coil support 4 is made of a thermally conductive material for the downward discharge of the calorific losses of the induction coil 1 and, in a known way, comprises a magnetic material 4a, for example ferrite bars, positioned from the bottom, the role of which is to focus the magnetic field generated by the induction coil 1 towards the receptacle 3 to be heated.

The assembly formed by the induction coil I and its coil support 4 is placed on a tray 5 made of non-magnetic material, for example aluminum, with a surrounding shoulder whose role is to minimize the parasitic magnetic fields of the induction coil 1 especially in order to shield the high-frequency current generator placed beneath, which supplies the induction coil 1.

Forced-air ventilation (arrow 20) is provided beneath the tray 5 to cool the induction coil 1 and its support 4.

In this type of induction cooking range, it is sought to maintain the induction coil 1 and its support 4 at a temperature compatible with their constituent elements, generally below 220° C., which is the maximum temperature that can be borne by the electrically insulating varnish of the copper strands of the conductor of the induction coil 1 and the plastic material of the coil support 4.

The heat exchanges take place in two opposite directions, on the one hand from the walls of the receptacle 3 towards its contents (arrows 21) which is the desired effect and on the other hand from the walls of the receptacle 3 to the induction coil 1 through the supporting plate 2 made of glazed ceramic and the thermal insulator 2a (arrows 22) which is an undesirable effect and, through the coil support 4 (arrows 23) from the induction coil 1 to the tray 5 which is cooled by the forced ventilation (arrow 20). There is a loss of efficiency due to the calories discharged by the forced ventilation.

Figure 2:
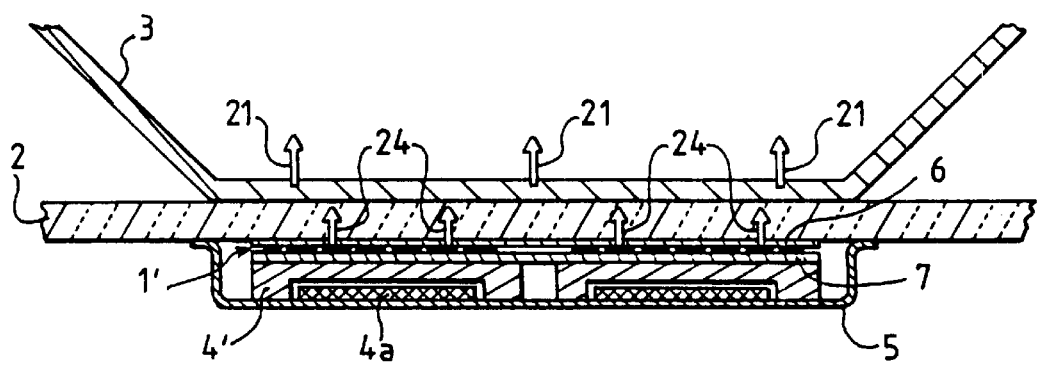

FIG. 2 illustrates a new induction cooking range structure in which this loss of efficiency is reduced by minimizing the heat exchange between the induction coil and the bottom of the range and by optimizing the heat exchange between the induction coil and the top of the range, towards the receptacle to be heated. To do this, the induction coil is allowed to get heated to a temperature greater than that of the load constituted by the receptacle, and the induction coil is cooled by the load. Thus, the calories due to the losses in the induction coil participate in the efficiency of the range. The induction coil must then be capable of reaching high temperatures in the range of 400° C., greater than the temperatures tolerated by the standard electrically insulating varnishes. This is why the winding used is a non-insulated, monoconductor winding, sized for the high frequencies, hence having very small dimensions. Another advantage related to the reduction of the volume of the conductors is a major reduction in the thermal inertia of the induction system and hence an acceleration of the cooling at the end of use.

FIG. 2 shows the receptacle 3 to be heated placed on the supporting plate 2 made of glazed ceramic.

The induction coil 1', in the shape of a flat pancake coil with a typical thickness of 500 $\mu$m, is placed beneath the glazed ceramic supporting plate 2 by means of a mica sheet 6 with a small thickness of about 200 $\mu$m providing for secondary electrical insulation with respect to the user, so as to optimize the heat transfer to the load. It may be laid on a second mica sheet 7 that is thicker and on a very thick (4 mm to 8 mm) thermally insulating coil support 4' that prevents the heat from spreading downwards to where the generator of high-frequency current exciting the induction coil is generally placed. Or else it is laid directly on the support 4' without the intermediary role of the second mica sheet. This option depends on the embodiment of the inductor.

As above, the coil support 4' is fitted out with a magnetic material 4a, for example ferrite bars or again a plastoferrite material, positioned by the bottom, to focus the magnetic field generated by the induction coil 1' towards the receptacle 3 to be heated and the entire unit formed by the induction coil 1' and its support 4' is placed on a tray 5 with a surrounding edge. This tray 5 is made of non-magnetic material, for example aluminum, and minimizes the parasitic magnetic fields generated by the induction coil 1'.

The heat exchanges take place essentially towards the receptacle to be heated and its contents (arrows 21 and 24) since the induction coil 1' has a working temperature greater than that of the walls of the receptacle 3 with which it is in thermal contact by means of the glazed ceramic supporting plate 2 and the thin mica plate 6 and since the coil support 4' is a heat barrier countering the propagation of heat towards the bottom of the range.

The need for the forced-air ventilation of the lower surface of the range disappears.

The acceptance of a higher working temperature for the induction coil, in the range of 400° C. instead of the usual 220° C., makes it possible to tolerate substantially greater losses and therefore greater current densities, in the range of 30 A/mm$^2$ instead of 8 A/mm$^2$. This results in very great reduction of the section of the monoconductor constituting the induction coil and therefore in a saving of material leading to a significant reduction in the price of the induction coil. The elimination of the ventilation of the induction system makes it possible, similarly, to significantly reduce the cost of the entire unit.

The induction coil may be made in different ways, either by the flat winding of a single-strand conductive strip so as to form a spiral or by cutting out this same conductor out of a sheet of non-magnetic, electrically conductive material such as copper or aluminum.

Should the induction coil be made by cutting out, for example by a mechanical or chemical method, the part obtained is difficult to handle because it has a typical diameter of 190 mm for a thickness of 500 μm, the number of turns corresponding to about 10 meters of wound wire. It is then advantageous to make a sandwich with the two heat-resistant electrical insulation sheets 6 and 7 attached on either side. To do this, the conductive spiral that has been cut out is first of all coated with a heat resistant electrically insulating compound in order to fill the spaces between the turns and then interposed between two heat-resistant electrically insulating sheets that may be mica sheets, pressed and subjected to heat treatment so that, with the electrically insulating sheets, they form a compact assembly. After heat treatment, the electrically insulating compound filling the spaces between the turns acts as an electrical insulator between the different turns of the induction coil. This electrical insulation between two neighboring turns is made necessary because of the shifts of the conductive strip forming the spiral, on account of its expansion during the temperature cycles. Besides, this phenomenon is a source of relative constraints for it makes it necessary not to go beyond certain operating temperatures, although the conductive strip and the mica sheets that electrically insulate the upper and lower faces of the induction coil can perfectly stand up to them. It is then necessary to detect these temperatures and limit the excitation current of the induction coil to prevent their being exceeded. The temperature detection can be done by means of standard known devices. However, it is possible to limit the shifts between neighboring turns of the conductive strip during the temperature cycles by playing on the geometry of the coil. For it is possible to make an induction coil by a series, parallel or even series-parallel combination of several small coils that have a round or other shape, distributed on the surface of the range so as to minimize the shifts between turns of the monoconductor strip by reducing the unit length of each elementary coil. The value of a cutting-out operation also lies in the fact that it makes it possible to obtain complex geometrical shapes of coils that cannot be obtained by winding. It is thus possible to envisage the simultaneous cutting out, for example, of the induction spiral and of the counter-turns used to reduce the radiated disturbances.

Figure 3:
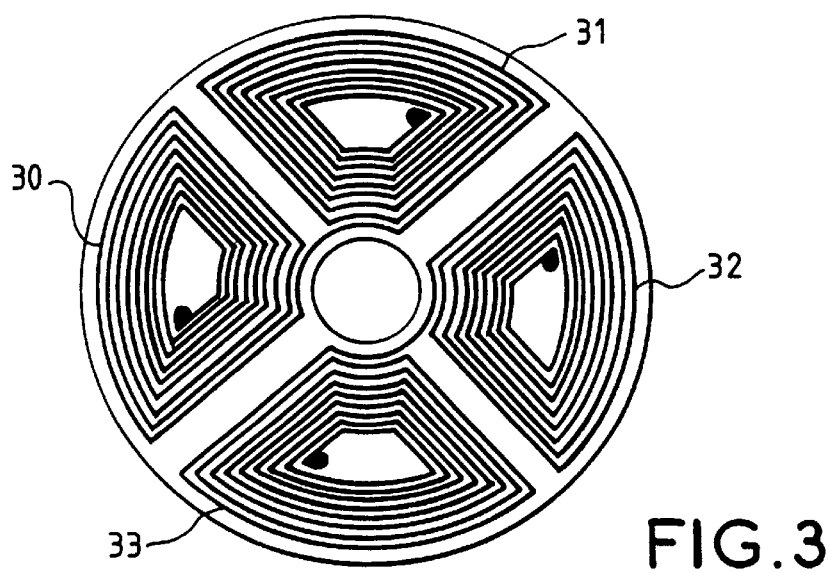
FIG. 3 shows a front view of an exemplary pattern made by the flat monoconductor strip of an induction coil of an induction cooking range according to the invention.

FIG. 3 shows a particular shape of coil in which the monoconductor strip in a flat arrangement forms four elementary spiral windings 30, 31, 32, and 33 occupying four circle sectors sharing the surface of the range. Thus, each elementary coil has a unit length four times smaller than the total coil. This means that it is the site, during the temperature cycles, of phenomena of shifts between neighboring turns that are much smaller than if there were to be a single winding. To reduce the interconnections external to the plane of the pancake of the induction coil, elementary windings are series-connected two by two by their external turns, either at the center of the range as shown or at the periphery of the range. It is furthermore noted that the elementary windings may have winding directions that are different as shown for the elementary windings 30 and 31 or 32 and 33 or may have the same directions of winding.

A non-negligible value of the new structure of the induction cooking range that has just been described brings the induction coil close to its load formed by the receptacle to be heated by eliminating the thermal screen habitually used between the induction coil and the load. There is therefore an increase in the resistance brought back in high frequency by the load to the induction coil. This leads to a reduction of the ampereturns in the induction coil and of the quantity of conductive material to be used. Consequently, the magnetic leakage and therefore the electromagnetic disturbances generated by the device are also minimized. This device calls for a limitation of the power for the small-diameter receptacles and more generally for receptacles whose diameter is smaller than the diameter of the coil. This reduction of power is natural and logical in a large majority of induction heating devices. It is important in this device for, if the coil should get cooled by the load, it is necessary that there should be a load facing the turns to be cooled, whence the need to reduce the power and hence the temperature in the presence of a small-diameter load, for the turns that are not covered are then more difficult to cool. This concept can also advantageously be related to a concept of an inductor that is self-adapted to the load (patents: French patent No 2 672 763 dated 7 th May 1993, European patent No 0 498 735 dated 24 th Aug. 1994 and French patent application No 94 14818 dated 9 th Dec. 1944). This concept is very easily applicable to this technology.

What is claimed is:

1. An induction cooking range comprising an upper plate made of a ceramic material designed to receive a receptacle to be heated made of ferrite material, a monoconductor induction coil positioned beneath the upper plate on a coil support and excited by a high-frequency current generator, wherein the monoconductor induction coil comprises a flat conductive strip having dimensions wound in a spiral and separated from the upper plate by a thermally conductive electrically insulating thin sheet having a top surface and a bottom surface for conducting thermal heat from said induction coil to said receptacle, and wherein the top surface directly contacts said upper plate and the bottom surface directly contacts said monoconductor induction coil.

2. A range according to claim 1, wherein the induction coil is separated from its support by a second thermally insulating sheet consisting of a heat-resistant electrical insulator.

3. A range according to claim 1, wherein the flat conductive strip of the induction coil is made of copper with a cross-section corresponding to a very high current density of the order of 30 A/mm$^2$.

4. A range according to claim 1, wherein the flat conductive strip of the induction coil is made of aluminum.

5. A range according to claim 1, wherein the induction coil is obtained by the flat, spiral winding of a flat monoconductor strip.

6. A range according to claim 1, wherein the induction coil is obtained by the cutting out of a flat, spiral conductor from a sheet of non-magnetic, electrically conductive material.

7. A range according to claim 1, wherein the induction coil forms a compact assembly that can be easily handled with the sheets of electrical insulator between which it is inserted.

8. A range according to claim 7, wherein the induction coil is coated with a heat-resistant, electrically insulating compound before it is inserted between the two electrically insulating sheets, pressed between them and subjected to heat treatment in order to form a laminated structure with them.

9. A range according to claim 1, wherein the induction coil is constituted by a series, parallel, or series-parallel combination of several flat coils with limited unit lengths, distributed on the surface of the cooking range.

10. A range according to claim 1, wherein said flat coils are series-connected two by two by their external turns.

11. A range according to claim 1, wherein the thermally conductive sheet of electrical insulator interposed between the induction coil and the upper plate is a thin sheet of mica.

12. A range according to claim 1, wherein the thermally insulating sheet of electrical insulator interposed between the induction coil and the coil support is a thick sheet of mica.

13. A range according to claim 1, wherein said support of the induction coil is a fiberglass-based material.

14. A range according to claim 1, fitted out with a device for the limiting of power as a function of its load.

15. An induction cooking range according to claim 1, wherein said induction coil has small enough dimensions to reach temperatures of approximately 400° C. during operation of said range.

* * * * *

UNITED STATES PATENT AND TRADEMARK OFFICE
CERTIFICATE OF CORRECTION

PATENT NO. : 5,866,884
DATED : February 2, 1999
INVENTOR(S) : Rene CORNEC et al.

It is certified that error appears in the above-identified patent and that said Letters Patent is hereby corrected as shown below:

On the title page, item [54], and at the top of Column 1, the Title should read:

--HIGH EFFICIENCY INDUCTION COOKING-RANGE WITH MONOCONDUCTOR HEATING COIL--

Signed and Sealed this

Sixth Day of July, 1999

Attest:

Q. TODD DICKINSON

*Attesting Officer*          *Acting Commissioner of Patents and Trademarks*